United States Patent
Chung et al.

(10) Patent No.: US 10,478,751 B2
(45) Date of Patent: Nov. 19, 2019

(54) ONSHORE LITHIUM-RECOVERING APPARATUS FOR LITHIUM ION ADSORPTION AND DESORPTION PROCESS AND LITHIUM-RECOVERING METHOD USING THE SAME

(71) Applicant: Korea Institute of Geoscience and Mineral Resources, Daejeon (KR)

(72) Inventors: Kang-Sup Chung, Daejeon (KR); Byung-Gyu Kim, Daejeon (KR); Tae-Gong Ryu, Daejeon (KR); In-Su Park, Gyeryong-si (KR); Hye-Jin Hong, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 267 days.

(21) Appl. No.: 15/597,429

(22) Filed: May 17, 2017

(65) Prior Publication Data
US 2018/0280831 A1   Oct. 4, 2018

(30) Foreign Application Priority Data

Mar. 31, 2017 (KR) .......................... 10-2017-0041441

(51) Int. Cl.
*B01D 15/36* (2006.01)
*B01D 15/20* (2006.01)
(Continued)

(52) U.S. Cl.
CPC ......... *B01D 15/203* (2013.01); *B01D 15/163* (2013.01); *B01D 15/362* (2013.01);
(Continued)

(58) Field of Classification Search
CPC .. B01D 15/163; B01D 15/203; B01D 15/362; C01D 15/00; C22B 3/24; C22B 26/12;
(Continued)

(56) References Cited

U.S. PATENT DOCUMENTS 10,087,083 B2 * 10/2018 Chung ...................... C22B 3/24
2011/0174739 A1   7/2011 Chung et al.

FOREIGN PATENT DOCUMENTS

| CN | 105251436 A | 1/2016 |
|----|-------------|--------|
| EP | 2562276 A1  | 2/2013 |

(Continued)

OTHER PUBLICATIONS

Korean Office Action dated May 24, 2017 issued in corresponding Korean Application No. 10-2017-0041441 (with English translation).

(Continued)

*Primary Examiner* — Matthew O Savage
(74) *Attorney, Agent, or Firm* — Harness, Dickey & Pierce, P.L.C.

(57) ABSTRACT

The present disclosure relates to an onshore lithium-recovering device for a lithium ion adsorption and desorption process including a supply unit for supplying lithium-containing water in which lithium is dissolved, a composite unit, a washing unit, a desorbing liquid unit, an extract liquid unit, a pressure adjusting unit, a discharge unit, and a control unit. Therefore, the lithium adsorption means is moved onshore so it is possible to significantly reduce the plant installation cost and the operating cost as compared to the lithium recovery process that operates the conventional offshore plant.

19 Claims, 9 Drawing Sheets

(51) Int. Cl.

| | | |
|---|---|---|
| *B01J 49/85* | (2017.01) | |
| *B01J 49/60* | (2017.01) | |
| *B01J 47/15* | (2017.01) | |
| *B01J 49/06* | (2017.01) | |
| *B01J 20/06* | (2006.01) | |
| *B01J 20/30* | (2006.01) | |
| *B01J 20/34* | (2006.01) | |
| *C22B 3/24* | (2006.01) | |
| *C22B 26/12* | (2006.01) | |
| *B01J 20/28* | (2006.01) | |
| *B01D 15/16* | (2006.01) | |
| *C01D 15/00* | (2006.01) | |
| *B01J 47/018* | (2017.01) | |
| *B01J 39/10* | (2006.01) | |
| *B01J 49/70* | (2017.01) | |

(52) U.S. Cl.
CPC ......... *B01J 20/06* (2013.01); *B01J 20/28045* (2013.01); *B01J 20/3007* (2013.01); *B01J 20/3433* (2013.01); *B01J 20/3475* (2013.01); *B01J 47/15* (2017.01); *B01J 49/06* (2017.01); *B01J 49/60* (2017.01); *B01J 49/85* (2017.01); *C01D 15/00* (2013.01); *C22B 3/24* (2013.01); *C22B 26/12* (2013.01); *B01J 39/10* (2013.01); *B01J 47/018* (2017.01); *B01J 49/70* (2017.01); *Y02P 10/234* (2015.11)

(58) Field of Classification Search
CPC .. B01J 20/06; B01J 20/28045; B01J 20/3007; B01J 20/3433; B01J 20/3475; B01J 39/10; B01J 47/018; B01J 47/15; B01J 49/06; B01J 49/60; B01J 49/70; B01J 49/85; C02F 1/006; C02F 1/42; C02F 2001/425; C02F 2103/008; C02F 2303/16; Y02P 10/234
USPC .................................................. 210/154, 341
See application file for complete search history.

(56) References Cited

FOREIGN PATENT DOCUMENTS

| | | |
|---|---|---|
| JP | S5687634 A | 7/1981 |
| JP | H06108169 A | 4/1994 |
| JP | 2001-089820 A | 4/2001 |
| JP | 2001-520312 A | 10/2001 |
| JP | 2009-161794 A | 7/2009 |
| JP | 2012-504190 A | 2/2012 |
| JP | WO2011132282 A1 | 7/2013 |
| KR | 10-0939516 B1 | 2/2010 |
| KR | 10-1133669 B1 | 4/2012 |
| KR | 10-1388545 B1 | 4/2014 |
| KR | 10-1388548 B1 | 4/2014 |
| KR | 10-1602459 B1 | 3/2016 |
| WO | WO-2017/052021 A1 | 3/2017 |

OTHER PUBLICATIONS

Extended European Search Report dated Jun. 14, 2018 issued in corresponding European Application No. 18157090.4.

* cited by examiner

ONSHORE LITHIUM-RECOVERING APPARATUS FOR LITHIUM ION ADSORPTION AND DESORPTION PROCESS AND LITHIUM-RECOVERING METHOD USING THE SAME

CROSS-REFERENCE TO RELATED APPLICATION

This application claims priority to Korean Patent Application No. 10-2017-0041441 filed on Mar. 31, 2017, and all the benefits accruing therefrom under 35 U.S.C. § 119, the contents of which is incorporated by reference in its entirety.

BACKGROUND OF THE INVENTION

(a) Field of the Invention

The present invention relates to a lithium-recovering apparatus and a recovering method capable of mass-producing lithium by separating lithium dissolved in lithium-containing water through a process of adsorption and desorption. More particularly, the present invention relates to a lithium-recovering apparatus and a lithium-recovering method using the same for a lithium ion adsorption and desorption process capable of recovering a large amount of lithium using an onshore plant, not an offshore plant.

(b) Description of the Related Art

Lithium is a rare non-ferrous metal widely used in secondary batteries, special glass, oxide single crystals, aviation, spring materials, and the like. In particular, with the recent development of the mobile phone, notebook and electric vehicle industry, a large amount of secondary batteries are being required, and the consumption of lithium is continuously increasing.

Lithium exists in a salt form in its natural state, and more than 70% of its total deposit is distributed mainly in salt lakes and rock salt, and is mainly recovered as lithium carbonate. However, because the source countries of lithium are unevenly distributed, the produced amount is not constant, so it is very difficult to secure lithium stably, and stable production of lithium is becoming a basic condition for industrial development.

On the other hand, it is estimated that about 250 billion tons of lithium ions are dissolved in seawater and it is starting to be recognized as an important lithium source. However, since the concentration is very low at 0.17 mg per liter of seawater, it is difficult to recover a large amount of lithium, and in consideration of economic efficiency of recovering lithium ions, a system for selectively recovering lithium ions at low cost is needed.

Conventionally, methods such as ion exchange adsorption, solvent extraction and co-precipitation have been studied for the recovery of lithium ions from seawater. Among these attempts, a lithium ion recovering method using manganese oxide-based inorganic adsorbents having ion exchanging characteristics with very high selectivity is one of the most preferable methods. Thus, various manganese oxide-based inorganic adsorbents are being developed. The manganese oxide-based inorganic adsorbent adsorbs lithium ions in the liquid by ion exchange, that is, topotactic extraction of hydrogen ions and lithium ions in a solution containing lithium ions, and then the inorganic adsorbent adsorbing lithium ions allows recovery of lithium ions through ion exchange of hydrogen ions and lithium ions in a diluted hydrochloric acid aqueous solution. Therefore, such a manganese oxide-based inorganic adsorbent has the advantage that it can be used repeatedly.

The present inventors have disclosed lithium manganese oxides, method for preparing the same, and lithium adsorbent using the same (Patent Document 1: Korean Granted Patent No. 0939516, Publication Date Feb. 3, 2010) as a method for producing a manganese oxide-based inorganic adsorbent to provide an excellent lithium manganese oxide.

In addition, sea water lithium recovering apparatus using coastal-water-based lithium adsorption equipment and shore-based lithium-isolation equipment (Patent Document 2: Korean Granted Patent No. 1388548, Publication Date Apr. 23, 2014) was disclosed to disclose a lithium recovering apparatus using coastal-water-based lithium adsorption equipment and shore-based lithium-isolation equipment.

However, by way of installing coastal-water-based lithium adsorption equipment and carrying lithium adsorbing means on the seawater, it is possible to greatly increase the recovery efficiency of lithium by maximally increasing the contact area of the lithium adsorbing means with seawater, but in the case of offshore plants, it is disadvantageous in that, it is affected by weather conditions and is disposed in the sea, which makes the maintenance of the lithium adsorbing means more difficult compared to a lithium adsorbing means disposed on land, and the total production cost of lithium is increased.

Therefore, it is a very urgent matter to develop an apparatus capable of increasing the efficiency of lithium production by arranging the lithium adsorbing means on the land to facilitate maintenance of the lithium adsorbing means.

SUMMARY OF THE INVENTION

Accordingly, the present disclosure is directed to having both of the lithium adsorption process in the lithium adsorbing means and the lithium extraction process performed in the lithium extraction means disposed in the sea, the adsorption/desorption process to be performed through one system on land, so that the operation and maintenance costs for the system is greatly decreased compared to the conventional offshore plant so the efficiency of lithium recovery is significantly increased.

The problems to be solved by the present disclosure are not limited to the above-mentioned problem(s), and other problem(s) not mentioned can be clearly understood by those skilled in the art from the following description.

To solve the above-mentioned problem, an exemplary embodiment of the present disclosure provides an onshore lithium-recovering apparatus for lithium ion adsorption and desorption process including, a composite unit disposed on land, supplied with lithium-containing water in which lithium is dissolved to adsorb the lithium dissolved in the lithium-containing water, and which desorbs the lithium again to discharge a lithium extract liquid; a washing unit disposed at one side of the composite unit, provided with a supply pipe to supply fresh water to the composite unit and to wash the composite unit; a desorbing liquid unit disposed at one side of the washing unit and which stores desorbing liquid or transfers the desorbing liquid through the supply pipe to supply the desorbing liquid to the composite unit; and an extract liquid unit disposed at one side of the composite unit and which receives and stores the lithium extract liquid generated by passing the desorbing liquid supplied from the desorbing liquid unit through the composite unit.

In one embodiment of the present disclosure, the present disclosure provides an onshore lithium-recovering apparatus for lithium ion adsorption and desorption process including, a supply unit for supplying lithium-containing water in which lithium is dissolved; a composite unit disposed on land, in which the lithium-containing water is introduced to adsorb the lithium dissolved in the lithium-containing water, and which desorbs the lithium again to discharge a lithium extract liquid; a washing unit disposed at one side of the composite unit, provided with a supply pipe to supply fresh water to the composite unit and to wash the composite unit; a desorbing liquid unit disposed at one side of the washing unit and which stores desorbing liquid or transfers the desorbing liquid through the supply pipe to supply the desorbing liquid to the composite unit; an extract liquid unit disposed at one side of the composite unit and which receives and stores the lithium extract liquid generated by passing the desorbing liquid supplied from the desorbing liquid unit through the composite unit; a pressure adjusting unit disposed at one side of the composite unit and which adjusts the flow of the lithium-containing water by adjusting a pressure in the composite unit; a discharge unit communicating with the pressure adjusting unit to discharge the lithium-containing water from which the lithium is recovered; and a control unit for controlling the flow of the lithium-containing water in the composite unit, the fresh water in the washing unit, and the desorbing liquid in the desorbing liquid unit.

Further, the lithium-containing water may be seawater taken directly from offshore using an intake pipe, or may be seawater for cooling a nuclear power plant or a thermal power plant disposed around the supply unit.

Further, the lithium-containing water may be saltwater taken from lake brine around the supply unit.

Further, the lithium-containing water may be geothermal water discharged from underground around the supply unit.

Further, the lithium-containing water may be concentrated water discharged from desalination equipment.

Further, the composite unit may further include a housing; a plurality of conduits provided inside the housing and which communicate with the supply unit; a fixed block installed in the plurality of conduits and directly in contact with the lithium-containing water, wherein the lithium ions dissolved in the lithium-containing water are adsorbed or the lithium ions are desorbed even when the desorbing liquid is introduced, while maintaining its shape; a flow rate adjusting means provided at both ends of the plurality of conduits for adjusting the lithium-containing water; and a sensing means disposed on one side of the flow rate adjusting means for measuring the degree of contamination of the fixed block.

Further, the housing may be provided so that one surface may be opened, to enable confirmation of the contamination state of the fixed block, and the fixed block can be detached and replaceable.

Further, the plurality of conduits may be provided separately from each other, and may be replaced when the fixed block installed in the conduit is contaminated by the lithium-containing water.

Further, a sprinkler may be disposed inside the plurality of conduits.

Further, the flow rate adjusting means may be an automatic adjusting valve that detects a pressure difference due to a flow rate variation of the lithium-containing water to maintain the pressure difference at a predetermined level and adjusts the flow rate to a predetermined flow rate.

Further, the fixed block may be an ion-sieve manganese oxide adsorbent wherein lithium is extracted by the desorbing liquid, obtained by molding lithium manganese oxide into a honeycomb form block or a porous material block.

Further, the fixed block may be inserted and fixed to a fixing guide provided on the plurality of conduits.

Further, the fixed block may be provided to be spaced apart inside the plurality of conduits at regular intervals.

Further, the distance between the fixed blocks may be less than or equal to ½ of the length of each fixed block.

Further, the pressure adjusting unit may be separately provided with a main pump and a spare pump.

Further, the desorbing liquid unit may supply the desorbing liquid until the lithium ions at the fixed block provided at the composite unit are extracted, to continuously circulate the desorbing liquid from the composite unit to the desorbing liquid unit.

Further, the extract liquid unit supplies the desorbing liquid supplied from the desorbing liquid unit to the composite unit and desorbs lithium ions to form the lithium extract liquid, but when the lithium extract liquid exceeds a predetermined standard concentration, the lithium extract liquid can be recovered and stored.

Further, the discharge unit may be provided as a seal pit to discharge the lithium-containing water from which lithium has been recovered in accordance with a fluid flow caused by gravity.

According to another aspect of the present disclosure, the present disclosure provides a lithium-recovering method using an onshore lithium-recovering apparatus including, (a) forming a fixed block by molding a lithium manganese oxide; (b) disposing the fixed block within a plurality of conduits; (c) introducing a desorbing liquid into the plurality of conduits to extract and discharge lithium of the lithium manganese oxide and forming an ion-sieve-type manganese oxide adsorbent; (d) recovering the desorbing liquid containing lithium to circulate the desorbing liquid to the plurality of conduits; (e) determining whether the fixed block has been changed to an ion-sieve-type manganese oxide adsorbent; (f) taking in lithium-containing water to introduce into the plurality of conduits when the fixed block is changed to a manganese oxide adsorbent, thereby adsorbing dissolved lithium in the lithium-containing water to the fixed block; (g) producing lithium extract by introducing the desorbing liquid into the conduits to desorb lithium ions at the fixed block; (h) confirming the content of lithium ions in the lithium extract liquid; (i) separating and storing in the extract liquid unit when a predetermined standard is exceeded; (j) confirming whether or not the fixed block is contaminated; (k) removing contaminants from the fixed block by preventing the introduction of the lithium-containing water and introducing fresh water into the plurality of conduits when contamination of the predetermined standard or higher is detected; and (l) after the contamination of the fixed block is removed, adsorbing the dissolved lithium in the lithium-containing water to the fixed block by taking in the lithium-containing water and introducing the lithium-containing water into the plurality of conduits.

Further, in step (a), the lithium manganese oxide may be molded into a honeycomb form block or a porous material block, but the fixed block may be formed so that it can be fixed through a fixing guide.

Further, in step (b), the fixed block may be disposed in a plurality of conduits, but the spaced distance between the fixed blocks may be less than or equal to ½ the length of adjacent fixed blocks.

Further, if the fixed block in step (e) has not been changed to the ion-sieve-type manganese oxide adsorbent, the process may be returned to step (c).

Further, in step (f), a flow rate adjusting means may be provided at both ends of the plurality of conduits so that a control unit controls the automatic adjusting valve and controls the flow of lithium-containing water introduced into the plurality of conduits individually.

Further, if the lithium ion content in the lithium extract liquid is less than or equal to a predetermined standard in step (h), the process may be returned to step (g).

Further, in step (j), a sensing means may be provided at both ends of the plurality of conduits to determine whether the fixed block is contaminated, and if contamination occurs, a control unit may introduce fresh water to wash the fixed block.

Further, in step (f), the fixed block is adsorbed with lithium ions, but in the case where adsorption efficiency is reduced by 30% or less than the initial adsorption efficiency, the fixed block may be replaced and repositioned in the plurality of conduits.

According to the present invention, it is possible to significantly reduce plant installation costs and operation costs compared to lithium recovery processes for operating conventional offshore plants by relocating lithium adsorbing means to land.

When the lithium adsorbing means is installed offshore, it is advantageous for having a large amount of seawater put in direct contact with the lithium adsorbing means. However, since the offshore plant is greatly affected by the weather, operation efficiency is greatly reduced and it is difficult to install and maintain the plant offshore. Therefore, in the case where the lithium adsorbing means is disposed on land, the efficiency of the entire lithium recovery process can be greatly increased.

Further, when the lithium adsorbing means and the lithium desorbing means are separated from each other, the entire installation space of the process is limited, but by arranging the lithium adsorbing means and the lithium desorbing means integrally in the same space to decrease the space taken up by the entire process, the convenience of the operation process is greatly increased.

Further, the lithium adsorbent forming process and the lithium adsorption, desorption and washing process can be integrated so as to be processed in one system.

Further, since the form of the conventional lithium adsorbent is fixed to facilitate maintenance, and contamination of the lithium adsorbent may be controlled by the introduction of a large amount of lithium-containing water, the recovery efficiency of lithium can be dramatically increased.

In addition, it is possible to provide an optimal commercial lithium-recovering apparatus, since it is much easier to expand, a plant onshore than offshore and since the capacity of the lithium-recovering process may be easily increased by adding a lithium adsorption module constantly in a plurality of reactors.

DETAILED DESCRIPTION OF THE EMBODIMENTS

Preferable exemplary embodiments of the present disclosure will be described in detail below with reference to the accompanying drawings.

The present disclosure and methods of accomplishing the same may be understood more readily by reference to the following detailed description of embodiments and the accompanying drawings.

However, the present disclosure may be embodied in many different forms, and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In addition, when it is determined that there is a known technology and the like in regards to describing the present disclosure which may blur the point of the present disclosure, detailed description thereof will be omitted.

Figure 1:
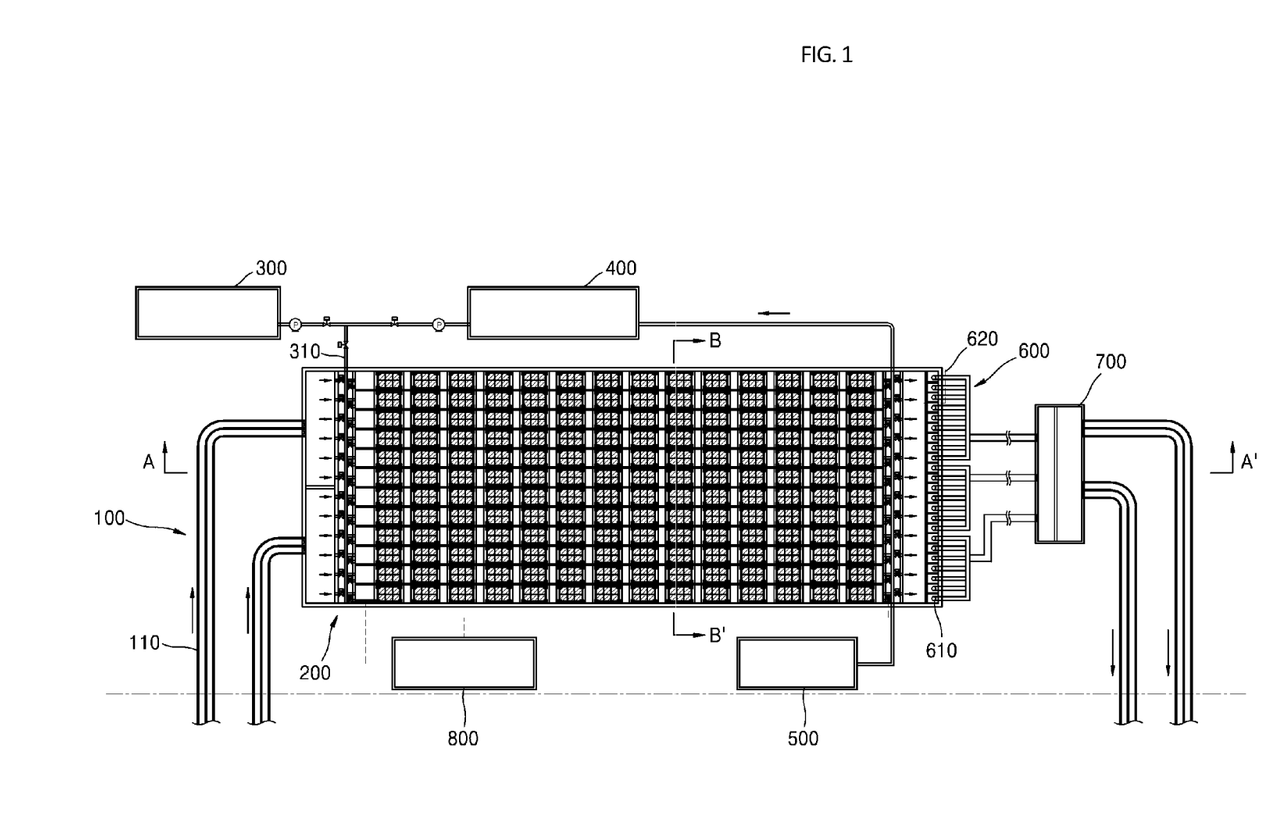
FIG. 1 is a plan sectional view of an onshore lithium-recovering apparatus for a lithium ion adsorption and desorption process according to an embodiment of the present invention.

FIG. 1 is a plan sectional view of an onshore lithium-recovering apparatus for a lithium ion adsorption and desorption process according to an embodiment of the present invention.

Referring to FIG. 1, an onshore lithium recovering-apparatus for a lithium ion adsorption and desorption process according to the present invention includes a composite unit 200, a washing unit 300, a desorbing liquid unit 400, and an extract liquid unit 500.

The composite unit 200 may perform a process of adsorbing and desorbing lithium by a method of receiving lithium-containing water to form a lithium adsorbent and receiving desorbing liquid from the desorbing liquid part 400, and can be washed by freshwater from the washing unit 300.

Through the composite unit 200, the formation of a lithium adsorbent, the adsorption and desorption of lithium, and the washing process of the lithium adsorbent may be integrated so as to configure one system.

In one detailed embodiment of the present invention, an onshore lithium-recovering apparatus for a lithium ion adsorption and desorption process according to the present invention includes a supply unit 100, a composite unit 200, a washing unit 300, a desorbing liquid unit 400, an extract liquid unit 500, a pressure adjusting unit 600, a discharge unit 700, and a control unit 800.

The supply unit 100 may supply lithium-containing water that has lithium dissolved therein.

The supply unit 100 may include an intake pipe 110.

The lithium-containing water may be seawater taken directly from the coast using an intake pipe 110, or may be seawater for cooling a nuclear power plant or a thermal power plant disposed around the supply unit 100.

In the case where the seawater is taken directly from the ocean, the intake pipe 110 may be extended from the shore to offshore to supply a large amount of seawater.

In particular, when the seawater is seawater for cooling a nuclear power plant, it is possible supply a large amount of seawater without adjusting the pressure of the pressure adjusting unit 600, thereby greatly increasing the efficiency of the lithium-recovering apparatus.

Looking at the amount of hot water discharged from power plants in 2010, a large amount of seawater is being discharged at a rate of 4.16 billion tons/year at Kori nuclear power plant, 6.16 billion tons/year at Yeonggwang nuclear power plant, 4.7 billion tons/year at Wolseong nuclear power plant, and 5.0 billion tons/year at Uljin nuclear power, so in the case where the supply unit 100 is disposed around a nuclear power plant, it has an advantage that the lithium-recovering apparatus can operate without including a pressure adjusting unit 600 having a very high efficiency.

Therefore, it is highly preferable that the supply unit 100 is disposed around a power plant so that the seawater discharged in large amounts can be used as it is.

The lithium-containing water may be saltwater taken using an intake pipe 110 from lake brine disposed around the supply unit 100.

In the case where the supply unit 100 is disposed around lake brine, saltwater may be taken to be supplied and in this case, it is advantageous to manufacture an onshore plant.

The lithium-containing water may be geothermal water discharged from underground around the supply unit 100.

Even in the case where geothermal water is used, the necessity for the pressure adjusting unit 600 to greatly adjust the pressure may be decreased, so it is preferable as supply water for an onshore lithium-recovering apparatus.

Since the content of lithium in the geothermal water and the saltwater is much higher than the seawater, the lithium recovery efficiency of the onshore lithium-recovering apparatus for the lithium ion adsorption and desorption process according to the embodiment of the present invention can be increased.

The lithium-containing water may be concentrated water discharged from desalination equipment.

When the concentrated water discharged from desalination equipment is selected as the lithium-containing water, since the concentrated water contains a large amount of lithium ions, the lithium recovery efficiency can be greatly increased.

Therefore, the onshore lithium-recovering apparatus for a lithium ion adsorption and desorption process according to the present invention can be disposed together with desalination equipment for seawater or saltwater.

The composite unit 200 is disposed on the shore, and the lithium-containing water is introduced to adsorb lithium dissolved in the lithium-containing water, and desorbed again to discharge lithium extract liquid.

The composite unit 200 replaces both the conventional lithium adsorption means and lithium desorption means, and after manufacturing the lithium adsorption means, the lithium-containing water is introduced to adsorb the dissolved lithium in the lithium-containing water, and a lithium extract liquid can be continuously produced.

Since the composite unit 200 can be installed directly on the shore, it is advantageous in that it can reduce the space limitation, and the operation, maintenance and repair costs of the conventional offshore plant.

Meanwhile, the composite unit 200 includes a housing 210, a plurality of conduits 220, a fixed block 230, a flow rate adjusting means 240, and a sensing means 241.

The housing 210 provides a space in which the plurality of conduits 220, the fixed block 230, the flow rate adjusting means 240 and the sensing means 241 are disposed, and the forming method is not limited, but since the shape should be kept constant while in surface contact with the ground surface, and the outer surface must be extended to be able to be increased as the capacity increases, it is highly preferable that it is manufactured with a precast concrete method.

Therefore, the housing 210 may be provided deformed in size depending on the amount of lithium ions recovered.

The housing 210 may be provided so that one surface may be opened, to enable confirmation of the contamination state of the fixed block 230, and the fixed block 230 can be detached and replaceable.

The conventional lithium adsorption means cannot be cleaned or exchanged even if a contamination due to seawater or saltwater, such as biofouling in particular, is formed in the conduit. However, one surface of the housing 210 is open, so the replacing task of the fixed block 230 can be easily carried out.

The plurality of conduits 220 are provided inside the housing 210 and communicate with the supply unit 100.

Figure 2:
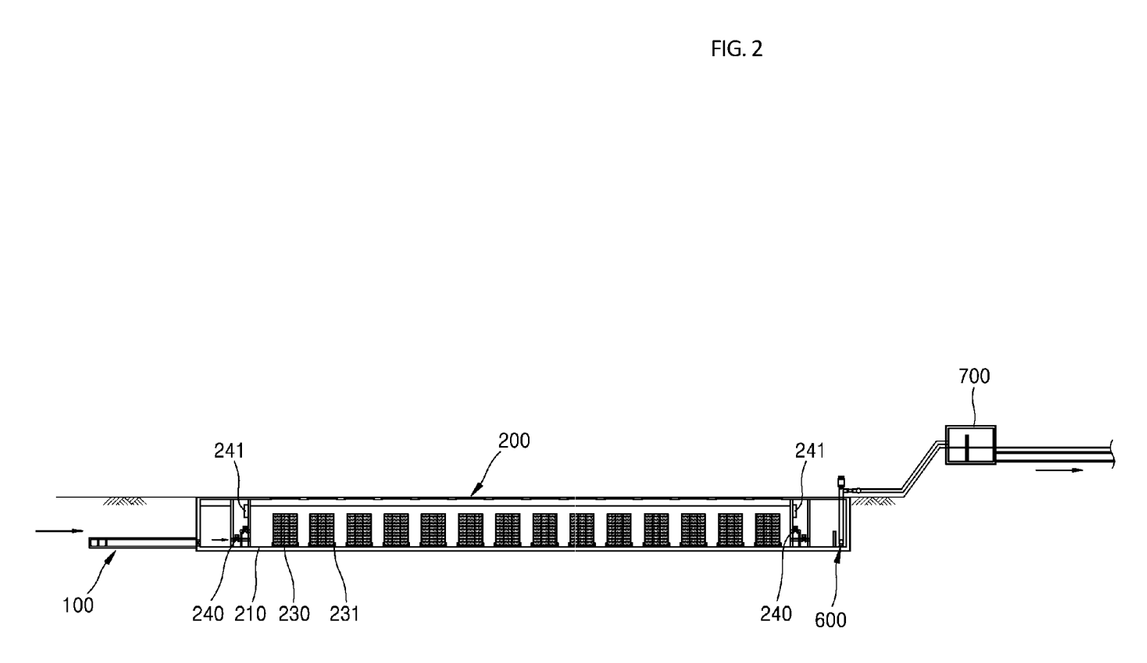
FIG. 2 is a side sectional view showing a cross-section taken along the line A-A in FIG. 1.
Figure 3:
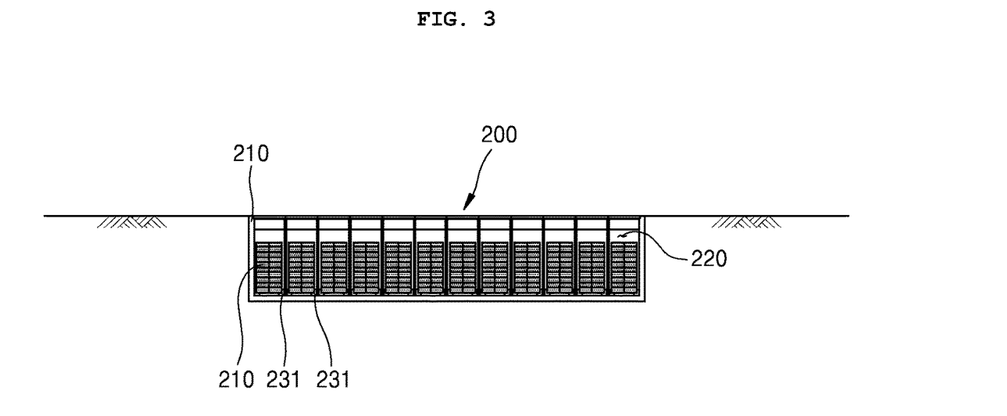
FIG. 3 is a side sectional view showing a cross-section taken along the line B-B in FIG. 1.

FIG. 2 is a side sectional view showing a cross-section taken along the line A-A in FIG. 1, and FIG. 3 is a side sectional view showing a cross-section taken along the line B-B in FIG. 1.

Referring to FIG. 2, the lithium-containing water is introduced from an intake pipe 110 of the supply unit 100 and is continuously transferred and flows along the plurality of conduits 220 that are communicating with the intake pipe 110.

Referring to FIG. 3, the plurality of conduits 220 are installed separately from each other, and a fixed block 230 is provided therein to allow the lithium-containing water to pass therethrough.

Since the plurality of conduits 220 are separated from each other, they can be replaced when the fixed block 230 installed in the conduit 220 is contaminated by the lithium-containing water.

The plurality of conduits 220 serve as reactors in which lithium-containing water is introduced and the adsorption or desorption reaction proceeds with lithium ions.

Figure 4:
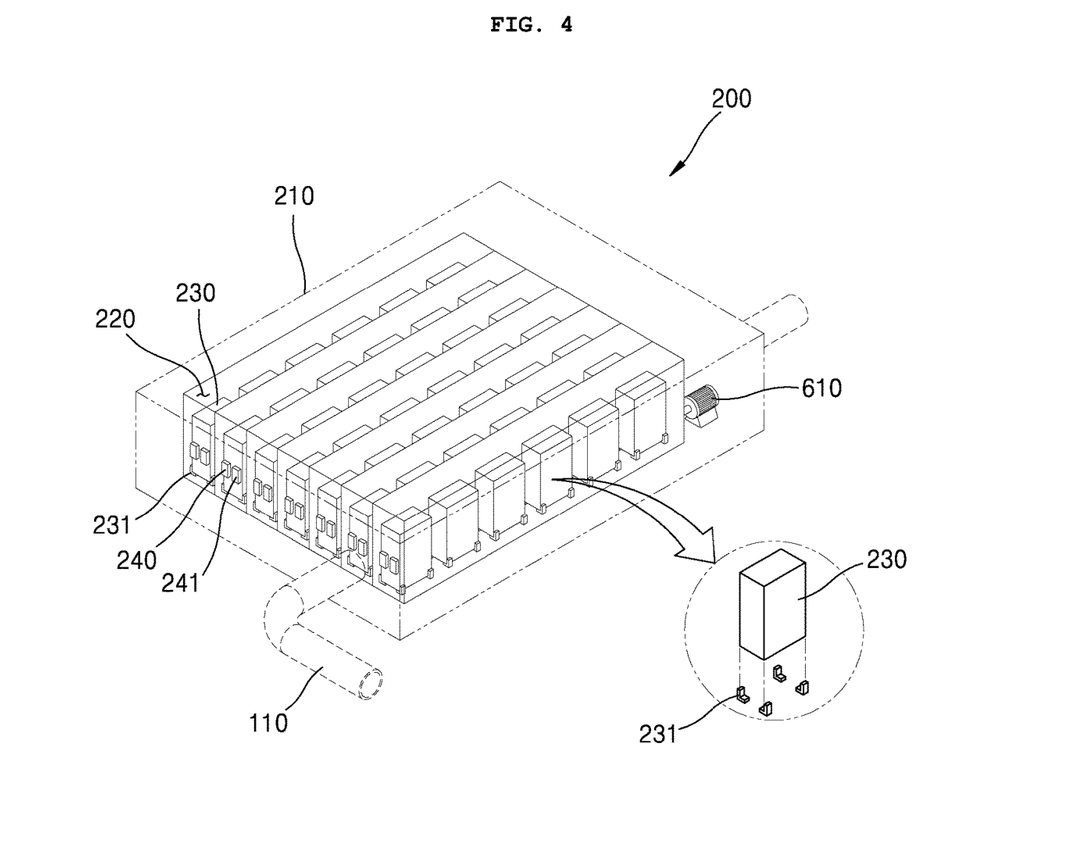
FIG. 4 is a perspective view of a composite unit according to FIG. 1.

FIG. 4 is a perspective view of a composite unit 200 according to FIG. 1.

Referring to FIG. 4, the fixed block 230 may be provided to be spaced apart inside the plurality of conduits 220 at regular intervals to be in direct contact with the lithium-containing water, wherein the lithium ions dissolved in the lithium-containing water may be adsorbed or even in a case where a desorbing liquid is introduced the shape of the fixed block 230 may be maintained while the lithium ions are desorbed.

The lithium-containing water may pass through the fixed block 230 and the lithium ions dissolved in the lithium-containing liquid may be adsorbed.

The fixed block 230 may be an ion-sieve manganese oxide adsorbent wherein lithium is extracted by the desorbing liquid, obtained by molding lithium manganese oxide into a honeycomb form block or a porous material block.

The fixed block 230 may be formed as an ion-sieve manganese oxide adsorbent by acid treatment of lithium manganese oxide so that the lithium ion is topotactically extracted by a desorbing liquid provided as an acid aqueous solution supplied from the desorbing liquid unit 400.

The manganese oxide adsorbent is preferably an ion-sieve manganese oxide having a spinel structure, particularly a manganese oxide having a spinel structure having a three-dimensional (1×3) tunnel structure, and a manganese oxide shown by a chemical formula $H_nMn_{2-x}O_4$ (where, $1 \le n \le 1.33$, $0 \le x \le 0.33$, $n \le 1+x$) is preferable, and $H_{1.33}Mn_{1.67}O_4$ is most preferable, but it is not limited thereto.

Modified manganese oxides with improved performance such as $H_{1.6}Mn_{1.6}O_4$ and $H_{1.6}(Mn_x-M_{y,\ x+y-1})1.6O_4$ (where M is a transition metal or another element replaceable with manganese) and the like may also be used in the exemplary embodiments according to the present disclosure.

The method of molding the fixed block 230 may be selected from known technology, and for example, a method of molding lithium manganese oxide powder into a honeycomb shape by heat treatment (Korean Granted Patent No. 10-0536957), a method of molding a lithium manganese oxide powder by mixing with a binder and then immersing in a urethane foaming agent (Korean Granted Patent No. 10-0557824), may be used and since they are known technology, a detailed description thereof will be omitted.

The illustration of FIG. 4 shows that the fixed block 230 is inserted in the fixing guide.

Referring to the illustration of FIG. 4, the fixed block 230 may be inserted into and fixed to a fixing guide 231 provided on the plurality of conduits 220.

The fixed block 230 may be formed into a hexahedral shape for convenience of fixing and maintenance, but is not limited thereto.

The fixing guide 231 is a means for fixing the fixed block 230 to the plurality of conduits 220 and is not particularly limited as long as the fixed block 230 can be fixed and then separated again.

In the embodiment of the present invention, the fixed block 230 is molded into a hexahedron and fixed in such a manner that the fixed block 230 is inserted and fixed to the protruding fixing guide 231.

The fixed block 230 is spaced apart from the plurality of conduits 220 at regular intervals.

The fixed block 230 is installed in plurality.

When the fixed blocks 230 are installed spaced apart from, each other, the fixed block 230 can be easily installed.

The adsorption capability of the adsorbent gradually decreases according to the repetitive adsorption/desorption process of lithium ions, and in the embodiment of the present invention, in the case where adsorption capability of the fixed block 230 is reduced by 30% or less than the initial adsorption efficiency, it may be determined that the replacement of the fixed block 230 is necessary.

The initial lithium adsorption efficiency can be determined on the basis of the amount of lithium ions initially adsorbed by adding the lithium-containing water after the desorbing liquid is added to the lithium manganese oxide to form the manganese oxide adsorbent.

When the fixed block 230 is determined to be a subject for replacement, the fixed block 230 spaced apart from each other can be very easily separated from and replaced at the plurality of conduits 220, and in this case, the recovery efficiency of the entire lithium ions may be maintained highly.

The distance between the fixed blocks 230 may be less than or equal to ½ the length of each fixed block 230.

If the spacing distance exceeds ½ the length of each fixed block 230, the number of total fixed blocks 230 that can be installed in the conduit 220 is limited, thereby reducing the absorption efficiency of lithium ions.

Further, when the spacing distance exceeds ½ the length of the fixed block 230, the flow of the lithium-containing water as a fluid is close to laminar flow, so the efficiency of adsorption of lithium ions is reduced.

When the distance is less than or equal to ½ the length of the fixed block 230, the flow of the lithium-containing water as a fluid may form a turbulent flow, and in this case, due to the irregular movement of the lithium-containing water an aeration effect is shown and the adsorption efficiency of lithium ions is greatly increased.

The flow rate adjusting means 240 is installed at both ends of the plurality of conduits 220 to adjust the flow of the lithium-containing water.

The flow rate adjusting means 240 may be an automatic adjusting valve that detects a pressure difference between both ends of the conduit 220 due to a flow rate variation of the lithium-containing water to maintain the pressure difference at a predetermined level, and adjusts the flow rate to a predetermined flow rate.

The flow rate regulating means 240 is interlocked with the control unit 800 and may control the amount of lithium-containing water introduced according to the selection of the control unit 800.

The control unit 800 controls the flow of the lithium-containing water of the flow rate adjusting unit 240 by experimentally checking the amount of lithium-containing water introduced and the amount of lithium ions recovered according to the volume of the composite unit 200.

The sensing means 241 is disposed at one side of the flow control means 240 to measure the degree of contamination of the fixed block 230.

The sensing means 241 is interlocked with the control unit 800 and when the degree of contamination of the fixed block 230 is measure and it is determined that contamination has occurred, the contamination state is transferred to the control unit 800.

Once the control unit 800 confirms the contamination of the fixed block 230, the control unit 800 adjusts the flow rate adjusting unit 240 to block the flow of lithium-containing liquid of the conduit 220 with the contaminated fixed block 230 installed.

The control unit 800 introduces fresh water to the conduit in which the fixed block 230 is installed through the washing unit 300 and washes the contaminated fixed block 230 with the fresh water.

In this case, contamination is removed from the fixed block 230 and the adsorption capability of lithium ions can be maintained constant.

Therefore, the sensing means 241 can detect the contaminated fixed block 230 among the plurality of fixed blocks 230 installed in the plurality of conduits 220 and introduce fresh water into only one conduit 220 to be cleaned, so it is possible to maintain a much higher efficiency than washing the plurality of conduits 220 all at once.

The washing unit 300 is disposed at one side of the supply unit 100 and includes a supply pipe 310 to supply the fresh water to the composite unit 200.

Fresh water supplied from the washing unit 300 flows through the supply pipe 310.

Figure 5:
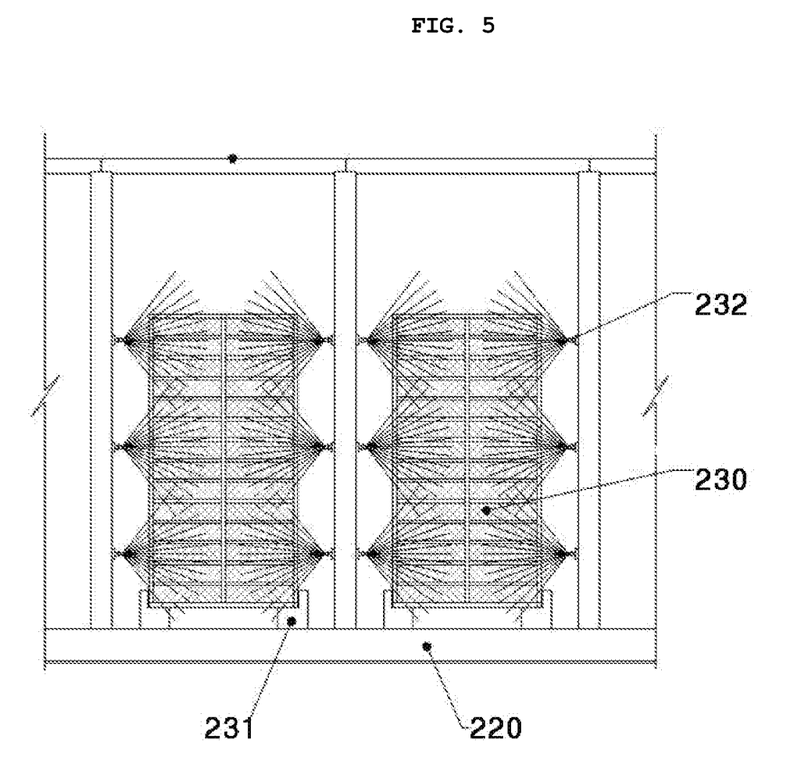
FIG. 5 is a cross-sectional view of a plurality of conduits in the composite unit according to FIG. 4.

FIG. 5 is a cross-sectional view of a plurality of conduits in the composite unit according to FIG. 4.

Referring to FIG. 5, a sprinkler 232 may be disposed inside the plurality of conduits 220.

When the sprinkler 232 is used, the contamination of the fixed block 230 can be quickly removed according to the rise of water pressure.

The desorbing liquid unit 400 is disposed on one side of the washing part 300 and stores the desorbing liquid or transfers the desorbing liquid through the supply pipe 310 to the composite unit 200.

The washing unit 300 and the desorbing liquid unit 400 supply fresh water and desorbing liquid to the composite unit 200 through the same supply pipe 310 and when fresh water is introduced, the desorbing liquid is not introduced, and conversely when the desorbing liquid is introduced, the fresh water is not introduced.

The desorbing liquid unit 400 supplies the desorbing liquid until all the lithium ions are extracted from the fixed block 230 provided in the composite unit 200 and can continuously circulate the desorbing liquid from the composite unit 200 to the desorbing liquid unit 400.

The desorption liquid is composed of an aqueous acid solution, and in the embodiment of the present invention, 0.1 to 1M of a hydrochloric acid aqueous solution can be used.

When an aqueous acid solution having a concentration of more than 1M is used, the extraction amount of manganese ions of the lithium manganese oxide increases so it may affect the performance of the ion-sieve adsorbent, and in the case of using an aqueous acid solution that is too diluted having a concentration of less than 0.1M, the production efficiency of the ion-sieve lithium manganese oxide adsorbent may be lowered.

The desorbing liquid introduced from the desorbing liquid unit 400 is continuously circulated through the fixed block 230 in the composite unit 200 so that the fixed block 230 is changed into a manganese oxide adsorbent capable of adsorbing lithium ions.

The desorption liquid introduced from the desorbing liquid unit 400 passes through the plurality of conduits 220 and is circulated to the desorbing liquid unit 400 again so that the desorbing liquid can be circulated until the entirety of the fixed block 230 is changed into the manganese oxide adsorbent.

The desorbing liquid can greatly reduce the consumption of desorbing liquid because lithium is recovered and circulated again after desorbing lithium from the fixed block 230.

The extract liquid unit 500 is provided at one side of the composite unit 200, and can receive the desorbing liquid supplied from the desorbing liquid unit 400 and store the lithium extract liquid containing lithium ions extracted by passing through the composite unit 200.

The extract liquid unit 500 supplies the desorbing solution supplied from the desorbing liquid unit 400 to the composite unit 200 and desorbs lithium ions to form a lithium extract liquid, but when the lithium extract liquid exceeds a predetermined standard concentration, the lithium extract liquid can be recovered and stored.

The standard concentration can be determined through an experiment in which the concentration of lithium ions in the desorbing liquid is increased by circulating the desorbing liquid of the desorbing liquid unit 400 and repeatedly measuring the same.

Therefore, the standard concentration may be determined according to the number of the fixed blocks 230 in the plurality of conduits 220.

Conventionally, the process of circulating a solution in which lithium ions have been extracted after the reaction of preparing a lithium adsorbent is repeated and the efficiency of lithium extraction can be increased, but when there is no need to circulate lithium ions due to sufficient extraction of lithium ions, there is no means for separating and storing the sufficiently extracted lithium extract liquid.

In the embodiment of the present invention, when lithium is completely separated from the lithium manganese oxide of the fixed block 230 to produce a manganese oxide adsorbent and the lithium ion concentration of the lithium extract liquid is sufficiently increased, the lithium extract liquid can be directly received and stored from the composite unit 200, so the efficiency of lithium recovery can be greatly increased.

Further, the extract liquid unit 500 may be configured such that the lithium-containing water is introduced into the composite block 200 and the lithium ions dissolved in the lithium-containing water are adsorbed after the fixed block 230 is formed into a manganese oxide adsorbent, and even when the desorbing liquid is introduced from the desorbing liquid unit 400 to desorb the lithium ions to generate a lithium extract liquid, the lithium extract liquid can be stored.

Since the extract liquid unit 500 can determine the concentration of the lithium extract liquid and recover it, the efficiency of the lithium ion adsorption and desorption process of the lithium recovery apparatus can be increased.

The pressure adjusting unit 600 may be separately provided with a main pump 610 and a spare pump 620.

When the pressure adjusting unit 600 is configured to be divided into a main pump 610 and a spare pump 620, the flow of the lithium-containing water can be kept constant without interruption, and the spare pump can be made to selectively operate according to the contents of lithium dissolved in the lithium-containing water so the total efficiency of the pressure adjusting unit 600 can be further increased.

The discharge unit 700 may communicate with the pressure adjusting unit 600 to discharge the lithium-containing water from which the lithium is recovered.

The discharge unit 700 may collect the seawater or salt water from which the lithium is recovered and supply it to the desalination equipment.

The discharge unit 700 is provided as a seal pit to discharge the lithium-containing water from which lithium is recovered in accordance with a fluid flow caused by gravity.

When the discharge unit 700 is provided as a seal pit, the lithium-containing water from, which the lithium is recovered can be discharged after collecting without a separate power source, so the efficiency of the lithium-recovering apparatus can be increased.

Meanwhile, the control unit 800 can control the flow of the lithium-containing water in the composite unit 200, the fresh water in the washing unit 300, and the desorbing liquid in the desorbing liquid unit 400.

The control unit 800 may determine the introduction of the desorbing liquid until the fixed block 230 is changed into the manganese oxide adsorbent by introducing the desorbing liquid from the desorbing liquid unit 400, and determine the washing of the fixed block 230 by introducing fresh water of the washing unit 300 when the fixed block 230 is contaminated by the lithium-containing water, and introduce the lithium-containing water to adsorb lithium ions, and introduce the desorbing liquid from the desorbing liquid unit 400 to desorb lithium ions and when the lithium extract liquid is generated, may determine whether or not the lithium extract liquid is to be separated and stored according to the concentration of the lithium extract liquid.

Therefore, an onshore lithium-recovering apparatus for a lithium ion adsorption and desorption process according to the embodiment of the present invention is configured such that the conventional lithium ion adsorption means and the lithium desorption means are moved to be on land to configure into an integrated type, and it is advantageous for increasing the capacity of extracting a large amount of lithium ions, and maintenance and repair can be performed very efficiently.

According to another aspect of the present invention, there is provided a lithium-recovering method using an onshore lithium-recovering apparatus.

Figure 6A:
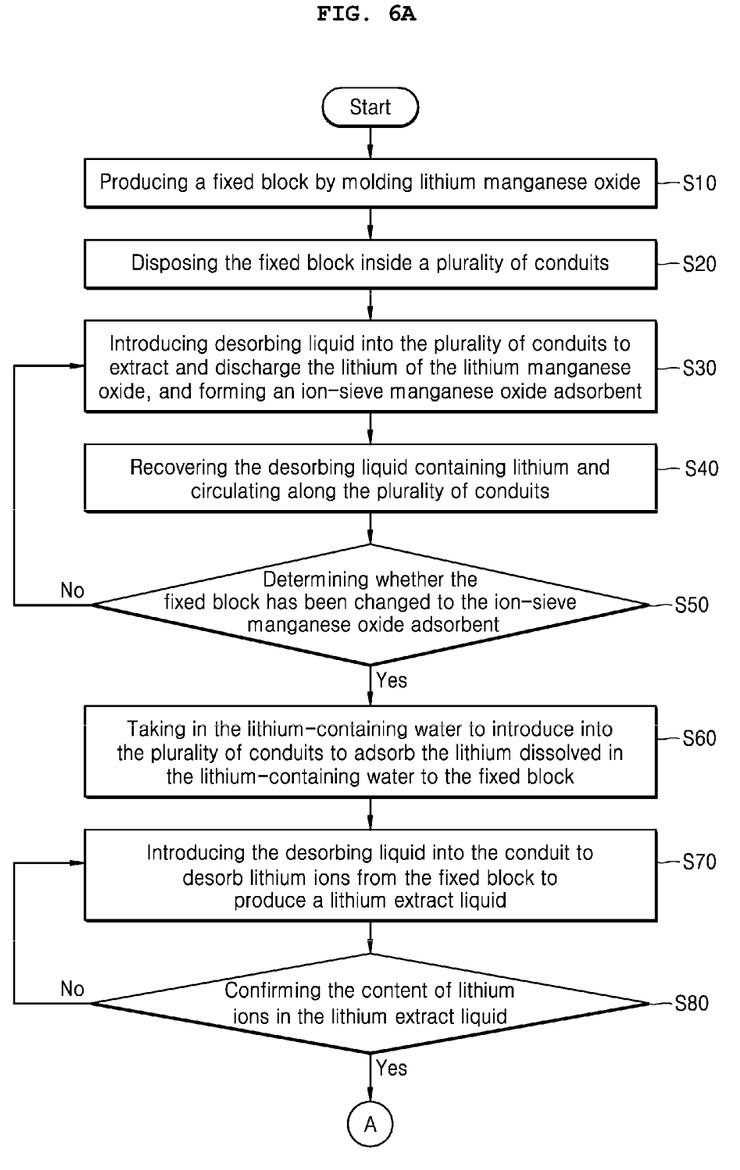
FIG. 6A is a first half of a flowchart showing a process sequence of a lithium-recovering method using an onshore lithium-recovering apparatus according to an embodiment of the present invention.

FIG. 6A is a first half of a flowchart showing a process sequence of a lithium-recovering method using an onshore lithium-recovering apparatus according to an embodiment of the present invention.

Figure 6B:
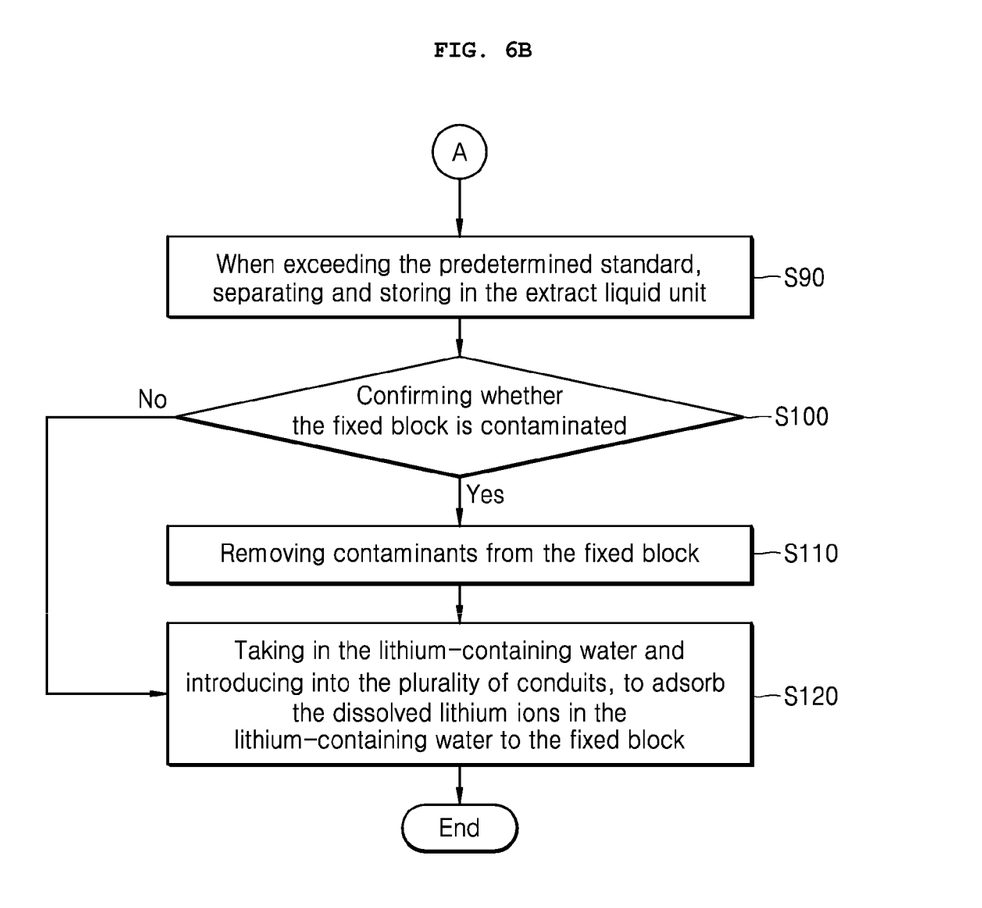
FIG. 6B is a second half of a flowchart showing a process sequence of a lithium-recovering method using an onshore lithium-recovering apparatus according to an embodiment of the present invention.

FIG. 6B is a second half of a flowchart showing a process sequence of a lithium-recovering method using an onshore lithium-recovering apparatus according to an embodiment of the present invention.

Referring to FIG. 6A and FIG. 6B, a lithium-recovering method using an onshore lithium-recovering apparatus may first produce a fixed block 230 by molding lithium manganese oxide at step 10.

The lithium manganese oxide may be molded into a honeycomb form block or a porous material block in the process of forming the lithium manganese oxide, but the fixed block 230 may be made so that it can be fixed through the fixing guide 231.

Since the formation of the lithium manganese oxide is based on the known technology described above, a detailed description thereof will be omitted.

The fixed block 230 may be disposed inside the plurality of conduits 220 at step 20.

The fixed block 230 may be disposed in a plurality of conduits, and the fixed block 230 is disposed such that the spaced distance between each of the fixed blocks 230 may be less than or equal to ½ the length of each fixed block.

If the spaced distance exceeds ½ the length of each fixed block 230, the number of total fixed blocks 230 that can be installed in the conduit 220 is limited, and the efficiency of adsorption of lithium ions is reduced.

Further, when the spacing distance exceeds ½ the length of the fixed block 230, the flow of the lithium-containing water as a fluid is close to laminar flow, so the efficiency of adsorption of lithium ions is reduced.

When the distance is less than or equal to ½ the length of the fixed block 230, the flow of the lithium-containing water as a fluid may form a turbulent flow, and in this case, due to the irregular movement of the lithium-containing water an aeration effect is shown and the adsorption efficiency of lithium ions is greatly increased.

Desorbing liquid is introduced into the plurality of conduits 220 to extract and discharge the lithium of the lithium manganese oxide, and an ion-sieve manganese oxide adsorbent may be formed in step 30.

The fixed block 230 is formed of lithium manganese oxide, but is changed into the ion-sieve manganese oxide adsorbent due to the desorbing liquid.

Figure 7:
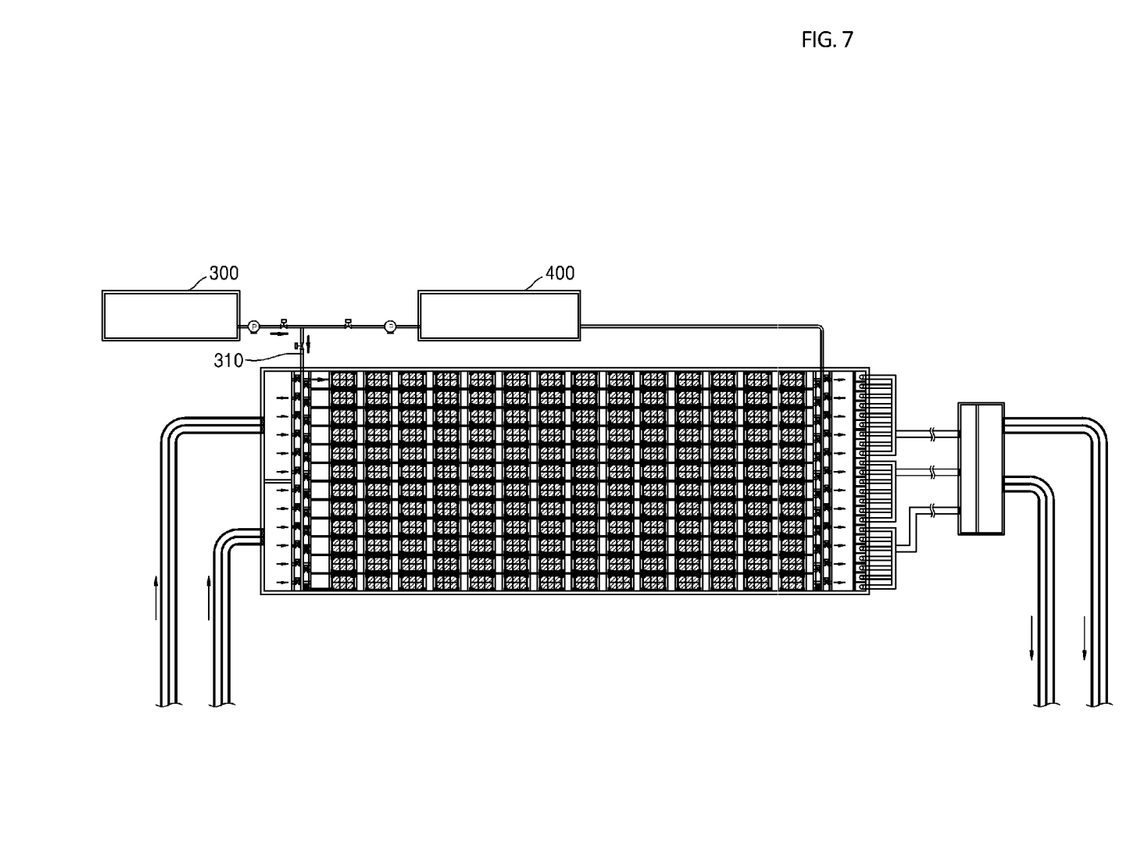
FIG. 7 is a schematic diagram showing the circulation of a desorbing liquid introduced from a desorbing liquid unit in the lithium-recovering method using an onshore lithium-recovering apparatus according to an embodiment of the present invention.

FIG. 7 is a schematic diagram showing the circulation of a desorbing liquid introduced from a desorbing liquid unit 400 in the lithium-recovering method using an onshore lithium-recovering apparatus according to an embodiment of the present invention.

Referring to FIG. 7, the desorbing liquid is introduced to extract lithium from the lithium manganese oxide, and desorbing liquid containing lithium is recovered and circulated along the conduit 220 in step 40.

At this time, it is determined whether the fixed block 230 has been changed to the ion-sieve manganese oxide adsorbent, and if the fixed block 230 has not been changed into the manganese oxide adsorbent, the desorbing liquid is continuously circulated, and if the fixed block 230 has been changed to the manganese oxide adsorbent, the introduction of the desorbing liquid is stopped and the lithium-containing water is introduced from the supply unit 100 in step 50.

The efficiency of the supply unit 100 can be greatly increased when the lithium-containing water is seawater for cooling a power plant or when it is geothermal water eluted from underground.

When the fixed block 230 is changed to a manganese oxide adsorbent, the lithium-containing water is taken in and introduced into the plurality of conduits 220 to adsorb the lithium that is dissolved in the lithium-containing water to the fixed block 230 in step 60.

A flow rate adjusting means 240 is provided at both ends of the plurality of conduits 220 so that the control unit 800 controls the automatic adjusting valve and controls the flow of lithium-containing water introduced into the plurality of conduits 220 individually.

Therefore, since the flow of the lithium-containing water introduced into the plurality of conduits 220 can be controlled, the lithium adsorption efficiency of the entire process can be determined.

A desorbing liquid is introduced into the conduit 220 to desorb lithium ions from the fixed block 230 to produce a lithium extract liquid in step 70.

The content of lithium ions in the lithium extract liquid can be confirmed in step 80.

At this time, if the lithium ion content in the lithium extract liquid is less than or equal to the predetermined standard, then the process may be returned to the step wherein the desorbing liquid is introduced into the conduit 220 and the lithium ions from the fixed block 230 is desorbed to produce a lithium extract liquid.

The concentration of the lithium extract liquid continuously increases while the desorbing liquid is circulated.

Here, if the predetermined standard is exceeded, the lithium extract liquid may be separated and stored in the extract liquid unit 500.

The standard may be determined experimentally according to the number of the fixed blocks 230 and the concentration of the ions may be determined again as the number of the fixed blocks 230 increases.

When the lithium extract liquid is separated and stored, lithium ions can be recovered more efficiently.

Conventionally, the entire process has to be stopped in order to recover the lithium extract liquid, but a plurality of conduits 220 are provided and the conduit 220 having the lithium ions of the lithium-containing liquid to be adsorbed and the conduit 220 having the lithium ions desorbed are separated from each other, and the process of desorption of lithium ions in any one of conduits 220 ions and adsorption in the remaining conduits 220 are carried out simultaneously so it is possible to have a continuous process of adsorbing and desorbing lithium ions.

Meanwhile, if the lithium-containing liquid is introduced and the adsorption and desorption step is repeated, the fixed block 230 is contaminated due to contaminants in the lithium-containing water.

Therefore, it is possible to confirm whether or not the fixed block 230 is contaminated in step 100.

At this time, when contamination of more than or equal to a predetermined standard is confirmed, introduction of the lithium-containing water is prevented, and fresh water is introduced into the plurality of conduits 220 to remove contaminants from the fixed block 230 in step 110.

The standard of confirming contamination can be experimentally determined by confirming the increase of the biofilm formed on the surface of the fixed block 230 by using the sensing means 241 as an optical medium.

Figure 8:
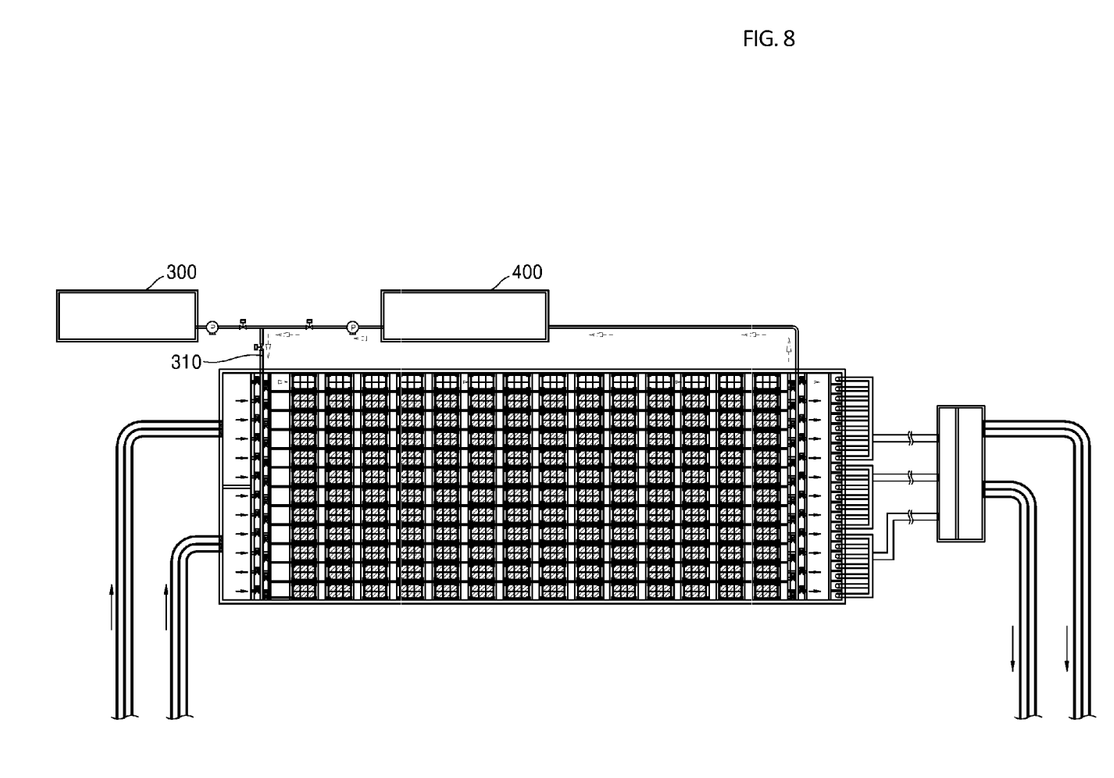
FIG. 8 is a schematic diagram showing a process of introducing fresh water into a washing unit in a lithium-recovering method using an onshore lithium-recovering apparatus according to an embodiment of the present invention.

FIG. 8 is a schematic diagram showing a process of introducing fresh water into a washing unit 300 in a lithium-recovering method using a lithium-recovering apparatus according to an embodiment of the present invention.

Referring to FIG. 8, the sensing unit 241 is installed at both ends of the plurality of conduits 220 to determine whether the fixed block 230 is contaminated or not, and the control unit 800 can introduce fresh water to wash the fixed block 230.

When the plurality of conduits 220 are provided, fresh water is introduced into the conduit 220 having the fixed block 230 that is contaminated with the lithium-containing water to proceed with the washing and the lithium-containing water is continuously passed through the remaining conduit 220 so the lithium ions are adsorbed and the entire process can be performed without interruption.

After the contamination of the fixed block 230 is removed, the lithium-containing water is taken in and introduced into the plurality of conduits 220, so that the dissolved lithium ions in the lithium-containing water can be adsorbed to the fixed block 230 in step 120.

The fixed block 230 can maintain the adsorption performance of lithium ions because the contaminants are washed away and removed.

Meanwhile, the lithium absorption and desorption efficiency of the fixed block 230 decreases after a predetermined time.

In this case, when the lithium ions are adsorbed to the fixed block 230 but the adsorption efficiency is reduced to 30% or less than the initial adsorption efficiency, the fixed block 230 may be replaced and disposed again within the plurality of conduits 220.

Since the plurality of conduits 220 are separated from each other, it is not necessary to separate the entire conduits 220, and it is advantageous in that the fixed block 230 can be easily replaced when one surface of the plurality of conduits 220 is opened.

Therefore, an onshore lithium-recovering apparatus for a lithium ion adsorption and desorption process according to the present invention and a lithium-recovering method using the same do not require a conventional offshore plant, which is difficult to maintain and repair, and discloses a configuration which can take in lithium-containing water directly to efficiently extract lithium.

It is possible to determine the lithium recovery efficiency by disposing a fixed block formed of a manganese oxide adsorbent on a plurality of conduits separated from each other and determining an introduction amount of the lithium-containing water, and in the case where contamination occurs on the fixed block due to extended use, the fixed block can be washed without interruption of the entire process and the process can be performed continuously.

Since the fixed block can be easily expanded by adding a fixed block as a lithium adsorption module, provided a plurality of conduits to the composite unit having the fixed block, it is possible to increase the capacity of the onshore lithium-recovering apparatus, so it is possible to configure an apparatus suitable for a real commercial mass production scale rather than a small pilot scale.

Although the specific embodiments of an onshore lithium-recovering apparatus for a lithium ion adsorption and desorption process and a method using an onshore lithium-recovering apparatus according to the present invention have been described so far, the present invention is not limited thereto, and it will be understood that various modifications may be made without departing from the scope of the present invention.

Accordingly, it is to be understood that the invention is not limited to the disclosed embodiments, and the scope of the present disclosure shall be determined by not only the attached claims, but also the equivalent arrangements included within the spirit of the appended claims.

That is, it is to be understood that the above-described embodiments are illustrative in all aspects and should not be construed as limiting, and the scope of the present invention is indicated by the appended claims rather than the foregoing description, and all changes or modifications that come within the spirit and scope of the invention are to be construed as being included within the scope of the present invention.

What is claimed is:

1. An onshore lithium-recovering apparatus for a lithium ion adsorption and desorption process comprising;
   a composite unit disposed on land, supplied with lithium-containing water in which lithium is dissolved to adsorb the lithium dissolved in the lithium-containing water, and which desorbs the lithium again to discharge a lithium extract liquid;
   a washing unit disposed at one side of the composite unit, provided with a supply pipe to supply fresh water to the composite unit and to wash the composite unit;
   a desorbing liquid unit disposed at one side of the washing unit and which stores desorbing liquid or transfers the desorbing liquid through the supply pipe to supply the desorbing liquid to the composite unit; and
   an extract liquid unit disposed at one side of the composite unit and which receives and stores the lithium extract liquid generated by passing the desorbing liquid supplied from the desorbing liquid unit through the composite unit.

2. An onshore lithium-recovering apparatus for a lithium ion adsorption and desorption process comprising:
   a supply unit for supplying lithium-containing water in which lithium is dissolved;
   a composite unit disposed on land, in which the lithium-containing water is introduced to adsorb the lithium dissolved in the lithium-containing water, and which desorbs the lithium again to discharge a lithium extract liquid;
   a washing unit disposed at one side of the composite unit, provided with a supply pipe to supply fresh water to the composite unit and to wash the composite unit;
   a desorbing liquid unit disposed at one side of the washing unit and which stores desorbing liquid or transfers the desorbing liquid through the supply pipe to supply the desorbing liquid to the composite unit;
   an extract liquid unit disposed at one side of the composite unit and which receives and stores the lithium extract liquid generated by passing the desorbing liquid supplied from the desorbing liquid unit through the composite unit;

a pressure adjusting unit disposed at one side of the composite unit and which adjusts the flow of the lithium-containing water by adjusting a pressure in the composite unit;

a discharge unit communicating with the pressure adjusting unit to discharge the lithium-containing water from which the lithium is recovered; and a control unit for controlling the flow of the lithium-containing water in the composite unit, the fresh water in the washing unit, and the desorbing liquid in the desorbing liquid unit.

3. The onshore lithium-recovering apparatus of claim 2, wherein the lithium-containing water is seawater taken directly from offshore using an intake pipe, or seawater for cooling a nuclear power plant or a thermal power plant disposed around the supply unit.

4. The onshore lithium-recovering apparatus of claim 2, wherein the lithium-containing water is saltwater taken from lake brine around the supply unit.

5. The onshore lithium-recovering apparatus of claim 2, wherein the lithium-containing water is geothermal water discharged from underground around the supply unit.

6. The onshore lithium-recovering apparatus of claim 2, wherein the lithium-containing water is concentrated water discharged from desalination equipment.

7. The onshore lithium-recovering apparatus of claim 2, wherein the composite unit further comprises:

a housing;

a plurality of conduits provided inside the housing and which communicate with the supply unit;

a fixed block installed in the plurality of conduits and directly in contact with the lithium-containing water, wherein the lithium ions dissolved in the lithium-containing water are adsorbed or the lithium ions are desorbed even when the desorbing liquid is introduced, while maintaining its shape;

a flow rate adjusting means provided at both ends of the plurality of conduits for adjusting the lithium-containing water; and a sensing means disposed on one side of the flow rate adjusting means for measuring the degree of contamination of the fixed block.

8. The onshore lithium-recovering apparatus of claim 7, wherein, the housing is provided so that one surface is openable, to enable confirmation of the contamination state of the fixed block, and the fixed block is detachable and replaceable.

9. The onshore lithium-recovering apparatus of claim 7, wherein the plurality of conduits are provided separately from each other, and are replaceable when the fixed block installed in the conduit is contaminated by the lithium-containing water.

10. The onshore lithium-recovering apparatus of claim 7, wherein a sprinkler is disposed inside the plurality of conduits.

11. The onshore lithium-recovering apparatus of claim 7, wherein the flow rate adjusting means is an automatic adjusting valve that detects a pressure difference due to a flow rate variation of the lithium-containing water to maintain the pressure difference at a predetermined level and adjusts the flow rate to a predetermined flow rate.

12. The onshore lithium-recovering apparatus of claim 7, wherein the fixed block is an ion-sieve manganese oxide adsorbent wherein lithium is extracted by the desorbing liquid, obtained by molding lithium manganese oxide into a honeycomb form block or a porous material block.

13. The onshore lithium-recovering apparatus of claim 7, wherein the fixed block is inserted and fixed to a fixing guide provided on the plurality of conduits.

14. The onshore lithium-recovering apparatus of claim 7, wherein the fixed block is provided to be spaced apart inside the plurality of conduits at regular intervals.

15. The onshore lithium-recovering apparatus of claim 14, wherein the distance between the fixed blocks is less than or equal to ½ of the length of each fixed block.

16. The onshore lithium-recovering apparatus of claim 2, wherein the pressure adjusting unit is separately provided with a main pump and a spare pump.

17. The onshore lithium-recovering apparatus of claim 2, wherein the desorbing liquid unit supplies the desorbing liquid until the lithium ions at the fixed block provided at the composite unit are extracted, to continuously circulate the desorbing liquid from the composite unit to the desorbing liquid unit.

18. The onshore lithium-recovering apparatus of claim 2, wherein the extract liquid unit supplies the desorbing liquid supplied from the desorbing liquid unit to the composite unit and desorbs lithium ions to form the lithium extract liquid, but when the lithium extract liquid exceeds a predetermined standard concentration, the lithium extract liquid is recovered and stored.

19. The onshore lithium-recovering apparatus of claim 2, wherein the discharge unit is provided as a seal pit to discharge the lithium-containing water from which lithium has been recovered in accordance with a fluid flow caused by gravity.

* * * * *